(12) United States Patent
Jändel

(10) Patent No.: US 6,226,413 B1
(45) Date of Patent: May 1, 2001

(54) METHOD FOR MOTION ESTIMATION

(75) Inventor: Magnus Jändel, Uppsala (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/064,164

(22) Filed: Apr. 22, 1998

Related U.S. Application Data

(63) Continuation of application No. PCT/SE96/01401, filed on Oct. 31, 1996.

(30) Foreign Application Priority Data

Nov. 8, 1995  (SE) ................................................ 9503950-9

(51) Int. Cl.[7] ........................................................ G06K 9/36
(52) U.S. Cl. ................................................................ 382/236
(58) Field of Search ...................................... 382/232, 233, 382/234, 235, 236, 237, 238, 239, 240, 244, 245, 246, 247, 166; 348/384, 390, 400, 401, 402, 409, 412, 413, 414, 415, 416, 417, 418, 420, 421, 430, 431; 358/426, 261.1, 261.2, 261.3, 427, 261.4, 429, 430, 432, 433

(56) References Cited

U.S. PATENT DOCUMENTS

| | | | | |
|---|---|---|---|---|
| 4,652,935 | * | 3/1987 | Endoh et al. | 382/232 |
| 4,682,869 | | 7/1987 | Itoh et al. | |
| 4,874,164 | * | 10/1989 | Miner et al. | 348/390 |
| 4,876,597 | * | 10/1989 | Roy et al. | 348/384 |
| 5,177,796 | * | 1/1993 | Feig et al. | 382/236 |
| 5,212,742 | * | 5/1993 | Normile et al. | 382/166 |
| 5,255,331 | * | 10/1993 | Kelly | 382/274 |
| 5,353,132 | * | 10/1994 | Katsuma | 382/166 |
| 5,442,458 | | 8/1995 | Rabbani et al. | |
| 5,485,533 | * | 1/1996 | Hatano et al. | 382/236 |
| 5,594,473 | * | 1/1997 | Miner et al. | 345/199 |
| 5,717,394 | * | 2/1998 | Scharwz et al. | 341/51 |
| 5,745,607 | * | 4/1998 | Maeda | 382/240 |
| 5,748,786 | * | 5/1998 | Zandi et al. | 382/240 |
| 5,831,678 | * | 11/1998 | Proctor | 348/422 |
| 5,867,602 | * | 2/1999 | Zandi et al. | 382/248 |
| 5,881,176 | * | 3/1999 | Keith et al. | 382/248 |
| 5,923,785 | * | 7/1999 | Dube | 382/240 |

FOREIGN PATENT DOCUMENTS

| | | |
|---|---|---|
| 0 400 998 A2 | 12/1990 | (EP) . |
| 0 467 040 A2 | 1/1992 | (EP) . |
| 0 595 599 A2 | 5/1994 | (EP) . |

* cited by examiner

Primary Examiner—Jose L. Couso
(74) Attorney, Agent, or Firm—Nixon & Vanderhye P.C.

(57) ABSTRACT

In transmission of bit plane coded (23) digitalized moving pictures, which are subject to a motion compensation (19) and an object based segmentation the bit planes are transmitted in order of decreasing significance. An incremental motion estimation (15, 17) and segmentation (11, 13) is performed in the transmitter (1) and the receiver (5) after each transmitted bit plane of a frame of the moving picture. As a result hereof the information, in particular the segmentation information, which must be transmitted is, in particular in the case of a low transmission rate, significantly reduced, due to the heavy reduction of motion parameters which must be transmitted. This method is, in particular, well suited for employment in low rate transmission systems, such as the public telephone network.

23 Claims, 2 Drawing Sheets

METHOD FOR MOTION ESTIMATION

This is a continuation of PCT application No. PCT/SE96/01401 filed Oct. 31, 1996.

TECHNICAL FIELD

The present invention is related to the use of motion estimation using motion compensation and segmentation in video coding, in particular for using motion estimation, motion compensation, and segmentation for bit plane coded moving pictures.

BACKGROUND OF THE INVENTION

Compression of moving digitalized pictures, e.g. video pictures, is a field that becomes of interest when they are to be transmitted. This is due to the large amount of information associated with a single image or frame of the moving picture and the restrictions to the bandwidths of the channels on which they are transmitted. Thus, when the capacity of the channel used is lower than the capacity required for transmitting the moving pictures as they are, some kind of compression will be needed.

Fortunately there is much redundancy associated with moving pictures, both within a single frame, spatial redundancy, and between successive frames of the moving picture, temporal redundancy. Exploitation of these redundancies will result in a reduction of the information, and hence a lower bit rate will be required.

STATE OF THE ART

Object based segmentation, i.e. a segmentation of the frames of a moving picture where the boundaries of the segments follow the edges of meaningful objects, and motion estimation based on such a segmentation is a common used technique in research to efficiently perform motion compensation in order to exploit the redundancies of successive frames in a moving picture.

Such methods are know from:

(A) M. Bober and J. Kittler, "General motion estimation and segmentation", Proceedings of conference on pattern recognition and image analysis, pp. 1–10, Valencia 1992, (B) M. Bober and J. Kittler, "Estimation and segmentation of complex motion for image coding", Proceedings of picture coding symposium, pp. 1–2 Lausanne, 1993.

One of the most significant drawbacks of the present approaches of this technique is that the information associated with the motion parameters and the contours of the segments need to be coded and transmitted. This results in a bit stream which in particular when very low bit rates are available can require as much as 50% of the available bandwidth.

Methods of compressing pictures, in particular moving pictures, which uses bit plane coding are described in our Swedish patent applications No. 9502557-3, 9503735-4 and 9503736-2.

SUMMARY OF THE INVENTION

It is an object of the present invention to provide a method and a device which provides, by means of object based segmentation and motion estimation, a motion compensation which can reduce the necessary bit rate when transmitting digitalized moving pictures without having to transmit the contours of the segments and the motion parameters, and hence significantly reduce the required capacity of the used channel.

This object is achieved with a bit plane coding technique using an incremental object based segmentation and motion estimation of the different bit planes, bit plane by bit plane, where the motion estimation is renewed and improved after each transmitted bit plane. The segmentation of the image, which is carried out so that the boundaries of the segments follow the boundaries of the objects inside the image, i.e. object based segmentation, is thus also renewed and improved after each transmitted bit plane.

The method of transmitting a bit plane coded moving picture can be divided into the following substeps:

1. The most significant bit plane of an image, e.g. a frame of a moving picture, is encoded according to some suitable coding algorithm possibly without the use of any segmentation or motion compensation and the bit plane is received and decoded by the intended receiver. The method used for coding the most significant bit plane can be any suitable algorithm, e.g. a method according to any of the ones described in the above mentioned Swedish patent applications Nos. 9502557-3, 9503735-4 and 9503736-2.

2. Based on the information provided by this most significant bit plane both the encoder and the decoder, i.e. the transmitting part and the receiving part of a transmission system, perform a segmentation in such a manner that the resulting segments correspond to the objects inside the image, i.e. an object based segmentation, and a motion estimation based on this segmentation.

3. Thereafter, the next to most significant bit plane is encoded and transmitted on the channel using a motion compensation based on the motion estimation carried out in step 2. The next to most significant plane is then decoded by the receiver.

4. Based on the information that is now at hand both in the transmitter and the receiver, i.e. the most and next to most significant bitplanes of the image, a new and improved segmentation and a new and improved motion estimation is performed.

5. The steps 3 and 4 are then repeated for the less significant planes in decreasing order of their significance down to the least significant bit plane that is to be transmitted.

BRIEF DESCRIPTION OF THE DRAWINGS

The invention will now be described by way of a detailed embodiment and with reference to the accompanying drawings in which.

DESCRIPTION OF A PREFERRED EMBODIMENT

Figure 1:
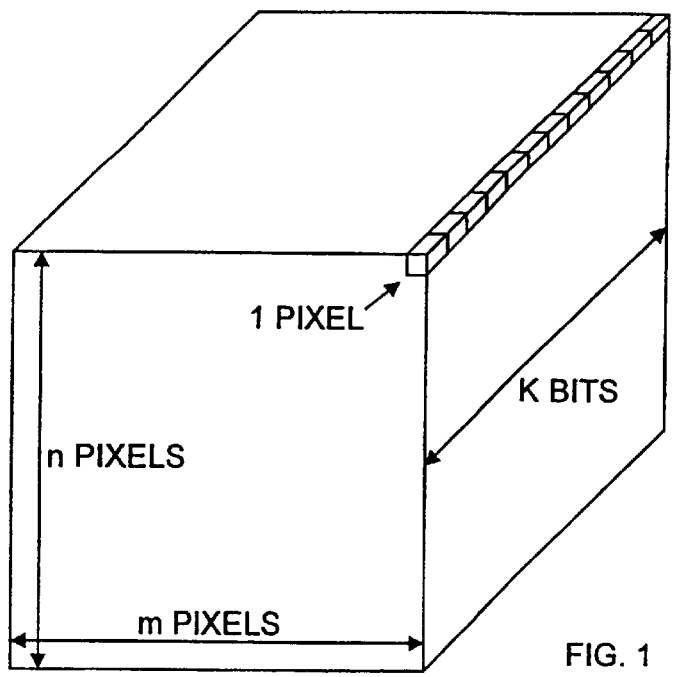
FIG. 1 is a picture illustrating the bit plane coding technique.

FIG. 1 shows a digitalized image having m×n pixels. Each pixel consists of k bits, e.g. eight bits as in the following example. The bits are so arranged that the most significant bit of each pixel represents a first, most significant, bit plane. The next to most significant bit of each pixel represents a second, next to most significant, bit plane and so on until the least significant bits of each pixel which form a last, least significant, bit plane.

Figure 2:
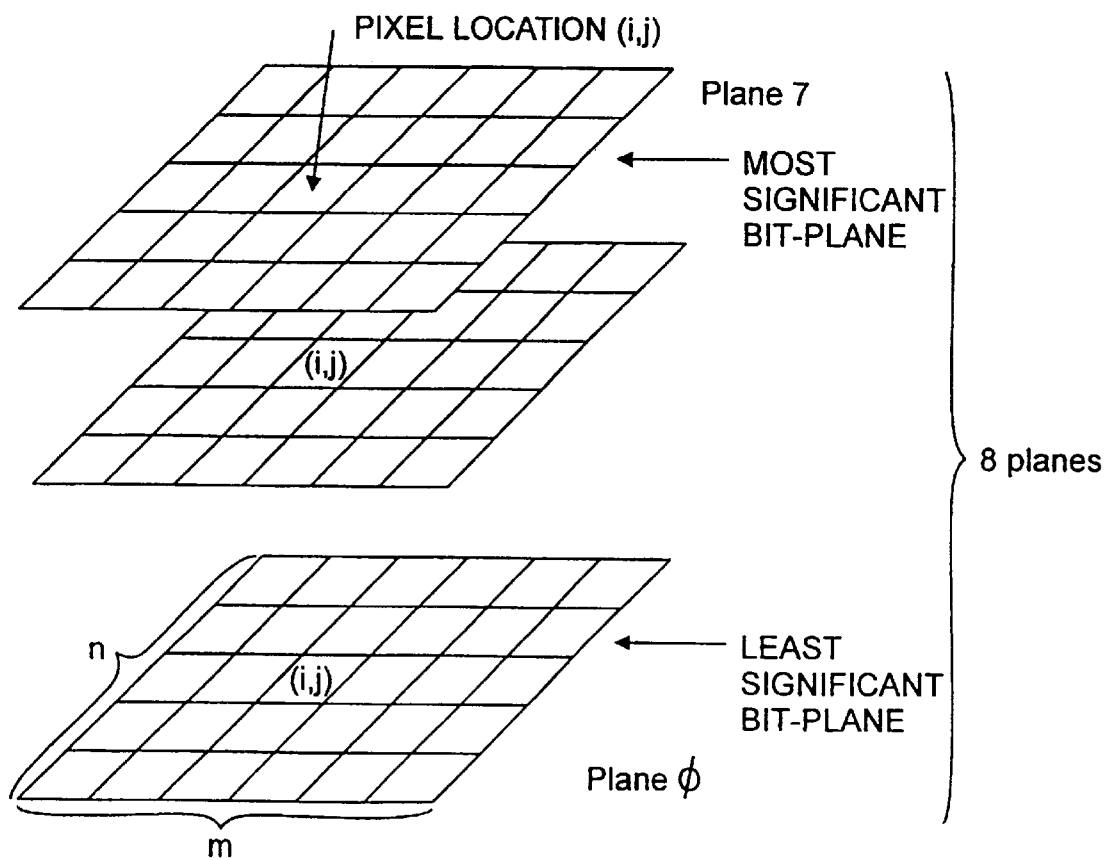
FIG. 2 is a picture illustrating the bit plane coded digitalized image which has 8 bits per pixel.

FIG. 2 shows a digitalized picture which has been bit plane coded according to the method described with reference to FIG. 1, and consists of m×n pixels or pels each consisting of eight bits, which have been arranged into eight bit planes, from the most significant bit plane 7 to the least significant bit plane 0.

Figure 3:
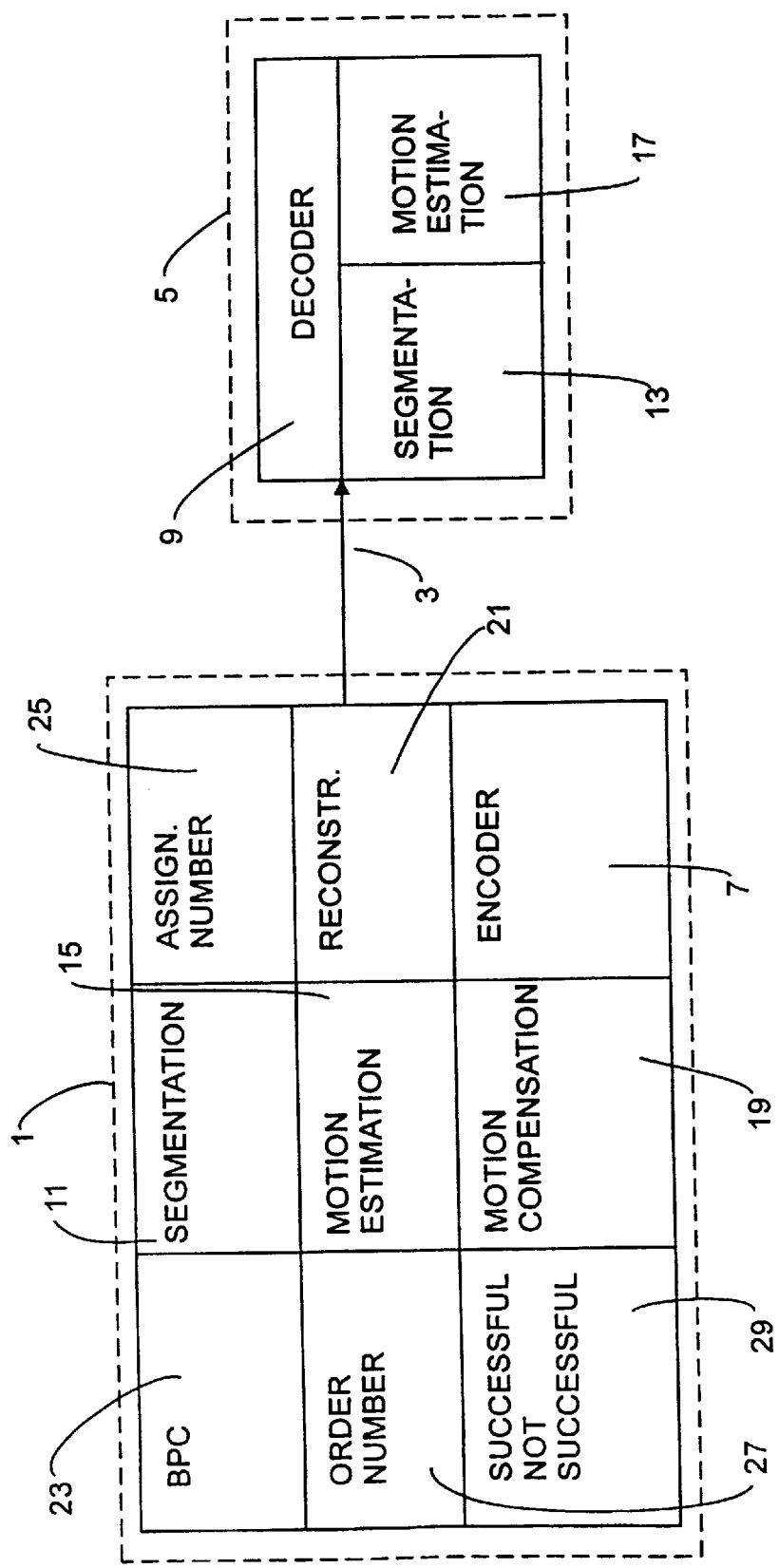
FIG. 3 is a picture illustrating different parts of an embodiment.

In FIG. 3 different parts of a transmission system is shown. The most significant bit plane, i.e. plane 7 of FIG. 2, which has been Bit Plane Coded (BPC) in the block 23 is then possibly compressed and encoded by an encoder 7 according to some suitable technique, e.g. by means of an entropy code, but without the use of any segmentation or motion compensation in the compression. The method that is used for coding the most significant bit plane can be any suitable algorithm, including lossless methods such as run length coding and lossy methods, which can or cannot include the use of motion compensation and segmentation.

The method used for coding the most significant bit plane is optimized for independent coding of this bit plane. All the parameters needed for a correct decoding of the most significant bit plane at the receiver must be transmitted.

The plane 7 is then transmitted by the transmitter 1 over a channel 3 and received by the receiver 5 which has means corresponding to those of the transmitter in order to accurately decode in a decoder 9 the received bit plane. The bit plane is decoded by the receiver 5, and hence the transmitter 1 and the receiver 5 both have access to the most significant bit plane, plane 7 or FIG. 2.

Based on the information provided by this bit plane, plane 7 of FIG. 2, both the encoder 7 of the transmitter 1 and the decoder 9 of the receiver 5 perform an object based segmentation algorithm and a motion estimation of the plane 7 of FIG. 2, according to the same algorithms, so that both the encoder 7 and the decoder 9 perform the same motion estimation and segmentation, i.e. the transmitter 1 and the receiver 5 will have identical segmentation of the bit plane of the current frame. The segmentations are performed in the blocks 11 and 13 and the motion estimations in the blocks 15 and 17 respectively.

Any suitable algorithm that performs motion estimation and segmentation can be used. This includes as a special case methods where a predefined block structure is used for segmentation and only motion estimation is performed. Hence, in the case when object based segmentation is employed, the methods earlier referred to and described in (A) and (B) can be used. In the case where a predefined block structure is employed, the block matching method, described in A. N. Netravali and B. G. Haskell, "Digital pictures", 2nd ed., Plenum Press 1995, p. 340 and which also is employed and described in ITU-T Recommendation H261, Geneva, August 1990, can be used.

The time when the encoder 7 of the transmitter 1 performs the segmentation is not important, i.e. the segmentation in the encoder 7 can be performed in advance to reduce the computational load on the encoder during the transmission, as long as it uses the same information available at the decoder 9 of the receiver 5, and thus identical segmentations are accomplished for the same bit plane and frame at both ends of the system.

At both ends of the system, i.e. at the encoder 7 of the transmitter 1 and at the decoder 9 of the receiver 5, a motion estimation is then performed, which uses the object based segmentation. The motion estimation is performed according to some suitable known method, the same method being used both by the encoder 7 and the decoder 9.

Next, the plane carrying the next to most significant bits of the pixels or pels is to be transmitted. In order to reduce the bits necessary to transmit of this plane 6 of FIG. 2 a motion compensation in the block 19 is performed based on the object based segmentation and motion estimation performed on plane 7 of FIG. 2. The motion compensation method used can be any suitable know method. The plane 6 of FIG. 2 is then transmitted over the channel 3 and received by the receiver 5 and decoded by its decoder 9.

The encoder 7 and decoder 9 then perform an incremental and improved object based segmentation of the image or frame and an incremental and improved motion estimation based on the improved segmentation is also performed. That is, a new object based segmentation and a corresponding motion compensation are performed by the encoder 7 and decoder 9 based on the information provided by the bit planes 7 and 6 of FIG. 2, which will be better since more information is available. As for the first object based segmentation and the corresponding motion estimation, it is not important at what time the segmentation and the motion estimation are performed in the encoder 7 as long as the only information used is that of the planes 7 and 6 of FIG. 2, so that the segmentation and the motion estimation will be identical in the encoder 7 and the decoder 9 after the transmission of plane 6 of FIG. 2.

The less significant bit planes, i.e. the planes 5, 4, 3, 2, 1 and 0 of FIG. 2, are then transmitted in decreasing order of significance. For each transmitted plane a new, improved, motion compensation is performed in order to reduce the number of bits that are necessary to transmit for that specific bit plane, where the motion compensation is based on the incremental and improved object based segmentation and the corresponding motion estimation of the previously transmitted bit planes of the frame.

Thus, the less significant planes will use more information for performing the segmentation and the motion compensation. This is a major advantage of the method, since it can be shown that the less significant bit planes require a higher bit rate, due to less redundancies in these planes, than the more significant ones. Therefore, a better motion compensation of the less significant bit planes, which becomes the result of having more information of the current frame, applied to these less significant bit planes will reduce these bit rates drastically.

The method as described above implies that the compression technique of the encoding technique used is lossless, i.e. the transmitted bit plane can be reconstructed exactly by the receiver 5 without any loss of information.

However, the method can also be used with a lossy encoding technique. It is then necessary to ensure that the decoded received bit plane and the bit plane used by the encoder 7 for the object based segmentation and the motion estimation carry the same information so that the object based segmentation and the motion estimation is performed on identical bit planes. This can be done by a reconstruction of the bit plane received by the decoder 9 in the encoder 7 of the transmitter 1, using the same procedure or algorithm as the decoder 9 uses. This reconstruction is performed in the block 21.

Hence, both the encoder 7 and the decoder 9 will perform the same processing of the encoded sequence, and thus they will both have access to the same information when performing the object based segmentation and the motion estimation.

The description above refers only to the luminance part of a transmitted signal. In the case of transmission of colour images, three different signal components must be transmitted, one luminance signal and two colour component signals. Each of these signals is then represented as a series of bit planes coded in the Bit Plane Coding (BPC) block 23. The total number of bit planes (N) can then typically be 24.

In order to apply the above described method for incremental motion estimation and method for segmentation, the bit planes are placed in an order, i.e. a serial number is associated with each bit plane. This is carried out in the block 25. In the sequential order thus established in a block 27, the luminance and colour bit planes can be mixed.

Then, the incremental motion estimation and segmentation method is applied to a number (M), M≦N, of the bit planes which are considered to be the most significant bit planes according to the in block 27 established order, i.e. for instance the bit planes given the lowest numbers of order, M can typically be 8. The number M can be predetermined by a user or automatically set by the transmission system. The remaining bit planes are coded using the motion estimation and segmentation parameters derived from the M most significant bit planes.

In particular, the established order can be such that the M most significant bitplanes are the luminance bit planes. The colour bit planes would then be coded using the motion estimation and segmentation parameters obtained from the luminance bit planes and the colour signal components would not be used for motion estimation and segmentation.

Furthermore, in a block 29 each segment of a particular bit plane can be classified in terms of successful/not successful motion compensation, i.e. the motion compensated segment is compared to the correct segment and according to some algorithm or criteria, a measure of how good the motion compensated segment is, is obtained. The algorithm used can for instance be a Mean Square Error (MSE) algorithm taken for each pixel of the bit plane and then summarized over the whole segment.

The value obtained by this procedure then can be compared to a threshold value in order to determine if the motion compensation was successful or not successful. If the result of this classification is that a segment is classified as not successful a motion compensation is not used. Such a segment will instead be coded according to some coding algorithm making use of the spatial redundancies within that particular segment.

The method described above makes it possible to overcome some of the most severe problems associated with the employment of object based motion estimation and segmentation. Hence, when using the method as described herein no motion parameters and no information regarding the contours of the segments need to be transmitted.

What is claimed is:

1. A method of transmitting bit plane coded moving pictures from a transmitter to a receiver, in which the moving pictures include images or frames that are subjected to a motion estimation, comprising:

the most significant bit plane of an image or frame is transmitted by the transmitter, the most significant bit plane is received by the receiver, a segmentation and motion estimation is performed both in the transmitter and the receiver based on this most significant bit plane, a successive bit plane of the frame or image is segmented and motion compensated based on the motion estimation performed on the most significant bit plane, and transmitting to the receiver the successive bit plane of the frame or image which has been segmented and motion compensated based on the motion estimation performed on the most significant bit plane.

2. A method according to claim 1, characterized in that a new, incremental segmentation and a new, incremental motion estimation is performed in the transmitter and in the receiver after each successive transmitted bit plane of the image or frame, where the new segmentation and the new motion estimation only use the transmitted and previously transmitted bit planes of the image or frame.

3. A method according to claim 2, characterized in that each new, incremental segmentation and motion estimation is used in the encoding of the successive bit planes of the frame or image.

4. A method according to claim 1, in which the images are colour images, characterized in that each bit plane is given an order number corresponding to its significance, the bit planes of the frames or image are transmitted in an order corresponding to the order numbers that they have been given.

5. A method according to claim 4, characterized in that only the first M, M being a positive integer set by a user or automatically set in the transmitter and the receiver, bit planes of a frame or image are transmitted in this manner, and that the remaining bit planes are motion estimated and segmented according to parameters derived from the first M transmitted bit planes.

6. A method according to claim 4, characterized in that the bit planes corresponding to the luminance component of the image are considered the most significant.

7. A method according to claim 4, characterized in that the bit planes which correspond to the colour components of the colour image are not used for incremental segmentation and incremental motion estimation.

8. A method according to claim 1, characterized in that the segmentations and motion estimations are performed both in the transmitter and in the receiver according to the same algorithm or procedure.

9. A method according to claim 1, characterized in that the transmitter reconstructs the bit plane received by the receiver.

10. A method according to claim 1, characterized in that the segmentation used is an object based segmentation.

11. A method according to claim 1, characterized in that each motion compensated segment of a bit plane is classified according to a successful/not successful procedure and that motion compensated segments decided to be not successful are not motion compensated and are instead coded according to some algorithm making use of the spatial redundancies within the segment.

12. A device for transmission of bit plane coded and possibly compressed moving pictures including images or frames that are subject to motion estimation, the device comprising:

a transmitter and a receiver, wherein the transmitter is arranged to first transmit the most significant bit plane of a frame, wherein the receiver is arranged to receive the most significant bit plane transmitted from the transmitter, segmentation means and motion estimation means for performing a segmentation and a motion estimation both in the transmitter and the receiver based on this most significant bit plane, and wherein the transmitter comprises means connected to the motion estimation means for performing a motion compensation on a successive bit plane of the frame or image based at least in part on the motion estimation performed on the most significant plane, and for transmitting the successive bit plane of the frame or image segmented and motion compensated.

13. A device according to claim 12 characterized in that segmentation and motion estimation means in the transmitter and in the receiver are arranged to perform a new, incremental segmentation and a new, incremental motion estimation after each successive transmitted bit plane of the image or frame, which means only use information from the transmitted and previously transmitted bit planes of the image or frame.

14. A device according to claim 13, characterized by means in the transmitter connected to the segmentation and motion compensation means for encoding successive bit planes using the new, incremental segmentation and a motion compensation based on the new, incremental motion estimation.

15. A device according to claim 12, in which the images are colour images, characterized by means for bit plane coding each signal component of the colour image, means in the transmitter for assigning a number of order to each bit plane, which number corresponds to the significance of the bit plane, and means in the transmitter for transmitting the bit planes of the frame or image in an order corresponding to the order numbers that they have been given.

16. A device according to claim 15, characterized in that the transmission means are arranged to only transmit the first M, M being a positive integer set by a user or automatically set in the transmitter and the receiver, bit planes of a frame or image in this manner.

17. A device according to claim 15, characterized in that the assigning means are arranged to assign the number of order in such a manner that the bit planes corresponding to the luminance component of the colour image are considered the most significant.

18. A device according to claim 15, characterized in that the segmentation and motion estimation means in the transmitter are arranged to determine that the bit planes which correspond to the colour components of the image are not used for the segmentation and motion estimation.

19. A device according to claim 12, characterized in that the means for performing segmentation and motion estimation both in the transmitter and in the receiver are arranged to work according to the same algorithms or procedures.

20. A device according to claim 12, characterized by means in the transmitter for reconstructing the bit plane received by the receiver.

21. A device according to claim 12, characterized in that the segmentation means in the transmitter and the receiver are arranged to perform an object based segmentation.

22. A device according to claim 12, characterized by:

means connected to the motion compensation means and to the segmentation means for classifying each motion compensated segment of a bit plane according to a successful/not successful procedure, and means for coding motion compensated segments, which are decided to be not successful according to some algorithm making use of the spatial redundancies within a segment.

23. A method of transmitting bit plane coded moving pictures from a transmitter to a receiver, in which the moving pictures include images or frames that are subjected to a motion estimation, the method comprising:

transmitting by way of a transmitter a significant bit plane of an image or frame;

receiving by way of a receiver the significant bit plane of the image or frame;

performing segmentation and motion estimation in each of the transmitter and the receiver based upon the significant bit plane;

segmenting and motion compensating a successive less significant bit plane of the frame or image based at least in part on the motion estimation performed on the significant bit plane, the successive less significant bit plane of the frame or image being less significant than the significant bit frame of the frame or image; and transmitting the successive less significant bit plane which has been segmented and motion compensated from the transmitter to the receiver.

* * * * *